United States Patent [19]

Haraguchi et al.

[11] 4,256,394
[45] Mar. 17, 1981

[54] CAMERA AUTOMATIC FILM WINDING DEVICE

[75] Inventors: Keisuke Haraguchi, Ranzan; Susao Nakamura, Tokyo, both of Japan

[73] Assignee: Asahi Kogaku Kogyo Kabushiki Kaisha, Tokyo, Japan

[21] Appl. No.: 57,147

[22] Filed: Jul. 12, 1979

[30] Foreign Application Priority Data

Jul. 27, 1978 [JP] Japan .......................... 53-103332[U]

[51] Int. Cl.³ .............................................. G03B 1/18
[52] U.S. Cl. ..................................... 354/173; 354/204
[58] Field of Search ................................ 354/173, 204

[56] References Cited
U.S. PATENT DOCUMENTS 3,895,389 7/1975 Arai ...................................... 354/173

*Primary Examiner*—Richard A. Wintercorn

*Attorney, Agent, or Firm*—Sughrue, Rothwell, Mion, Zinn and Macpeak

[57] ABSTRACT

An automatic film winding device in a camera in which a camera winding coupling is coupled to a motor drive side through a power transmission mechanism having a cam and a follower. The device comprises a cam system having a first cam for maintaining a motor drive circuit energized and a second cam for a film winding operation in said camera. After a release operation in the camera the motor drive circuit is energized in association with restoration of a camera release button or a shutter. The follower is displaced to the first cam by the relative motion of said first cam and follower caused by the further rotation of said motor, to maintain the motor drive circuit energized. After the completion of winding operation in the camera, the second cam is disengaged from the follower by the relative motion of the second cam and follower to deenergize the motor drive circuit.

5 Claims, 5 Drawing Figures

CAMERA AUTOMATIC FILM WINDING DEVICE

BACKGROUND OF THE INVENTION

This invention relates to an improvement in a motor drive winding device in a camera, in which the shutter release is effectuated by operating the shutter button in the camera, and the camera winding operation, that is, the film winding operation and the shutter charge are carried out by a motor driven in association with the restoration of the shutter button or the shutter.

In a motor drive winding device in a camera in which the subsequent shutter release cannot be carried out without eliminating a load applied to the camera when the film winding operation has been completed, a power transmission mechanism (hereinafter referred to as "a clutch mechanism" when applicable) is provided in order to eliminate the load applied to the camera when the film winding operation has been completed. For instance, a clutch mechanism having a cam and a follower is provided between a camera winding coupling and a motor drive mechanism. In this clutch mechanism, as shown in FIG. 1, when the follower is locked by a first cam protrusion 1a, the winding operation is started. When the winding operation is completed, the follower is moved to a cam surface 1b, the maximum displacement, by the relative motion of the cam and the follower, to deenergize the motor.

In this conventional method, in order to eliminate the load applied to the camera when the winding operation is completed, it is necessary that a gentle slope 1c is formed on the cam surface 1b to the extend that the motor is not energized, so that the follower is rotated reversely by the relative rotation of the slope 1c and the follower. Accordingly, the conventional clutch mechanism requires a fine and delicate assembly adjustment and a switch adjustment. Furthermore, since it is necessary to stop the follower on the cam surface 1d by suppressing the inertia, the motor must be braked. Thus, the conventional method suffers from various disadvantages.

SUMMARY OF THE INVENTION

Accordingly, an object of this invention is to eliminate all of the above-described difficulties in the prior art.

More specifically, an object of this invention is to provide a motor drive winding device for a camera, which is simple in construction and can completely release the load which is applied to the camera when the winding operation is effected, and which operates positively.

These and other objects of this invention are accomplished in an automatic film winding device in a camera in which a camera winding coupling is coupled to a motor drive side through a power transmission mechanism having a cam and a follower. The device comprises a cam system having a first cam for maintaining a motor drive circuit energized and a second cam for a film winding operation in said camera. After a release operation in the camera the motor drive circuit is energized in association with the restoration of a camera release button or a shutter. The follower is displaced to the first cam by the relative motion of said first cam and follower caused by the further rotation of said motor to maintain the motor drive circuit energized. After the completion of a winding operation in the camera, the second cam is disengaged from the follower by the relative motion of the second cam and follower to deenergize the motor drive circuit.

This invention will be described with respect to the drawings and the description of the preferred embodiment that follows.

DESCRIPTION OF THE PREFERRED EMBODIMENTS

One example of an automatic film winding device according to this invention will be described with reference to the accompanying drawings.

Figure 1:
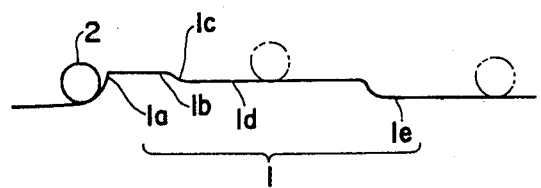
FIG. 1 is a cam spread diagram showing the relation between a follower 2 (or a roller 2) and a cam 1 in a clutch mechanism.
Figure 2:
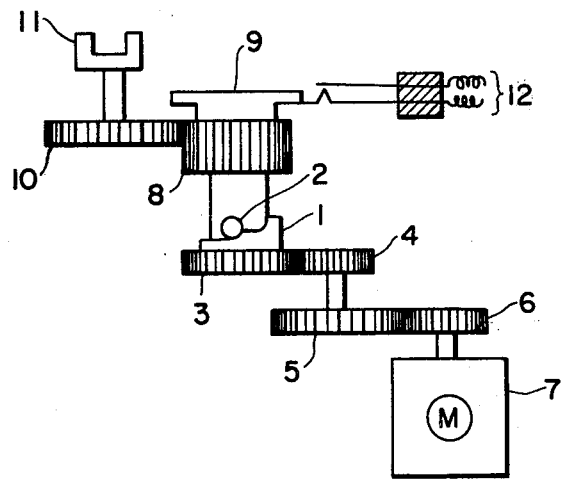
FIG. 2 is a front view showing one example of an automatic film winding device according to this invention.
Figure 3:
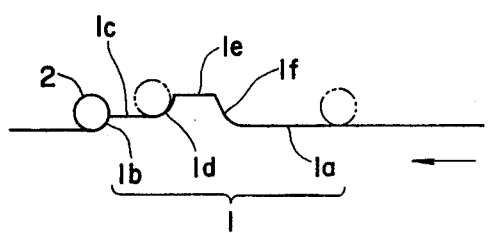
FIG. 3 is a cam spread view showing the realtion between a roller and a cam in a clutch mechanism employed in the example shown in FIG. 2.

Referring to FIG. 2, the driven side comprising a camera wind coupling 11 and interlocking gears 10 and 8 is completed to the drive side comprising a motor 7 and reduction gears 6, 5, 4 and 3 through a so-called "clutch mechanism". The clutch mechanism has a follower 2 (hereinafter referred to as "a roller 2" when applicable) and a cam 1. Reference numeral 9 designates a switch operating member integral with the gear 8. The switch operating member 9 opens a switch 12 when the roller 2 is on a cam surface 1a, and closes the switch 12 when it is on a cam surface 1c or 1e, as shown in FIG. 3. When the roller 2 is on a cam protrusion 1d, the winding operation is accomplished in the camera. When the roller 2 rides over a cam protrusion 1b, the closed switch 12 is opened.

Figure 4:
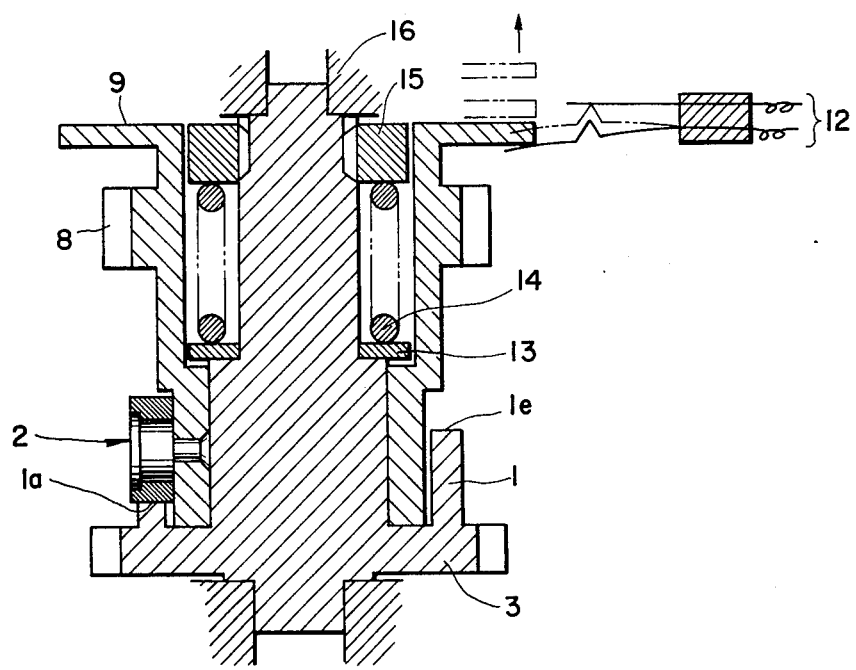
FIG. 4 is a sectional view of the clutch mechanism in the example shown in FIG. 2.

The clutch mechanism is illustrated in detail in FIG. 4. In FIG. 4, reference numeral 14 designates a clutch spring, and reference numeral 13 designates a washer. These components are provided so that, when the roller 2 is on the cam surface 1a, the roller 2 and the gear 8 on the driven side are not affected by the load of the clutch spring 14. When the roller 2 is on the cam surface 1c, the winding operation is effected by the spring load. In FIG. 4, reference numeral 15 designates a clutch spring load adjusting nut, and reference numeral 16 designates a bearing supported on a frame (not shown).

Figure 5:
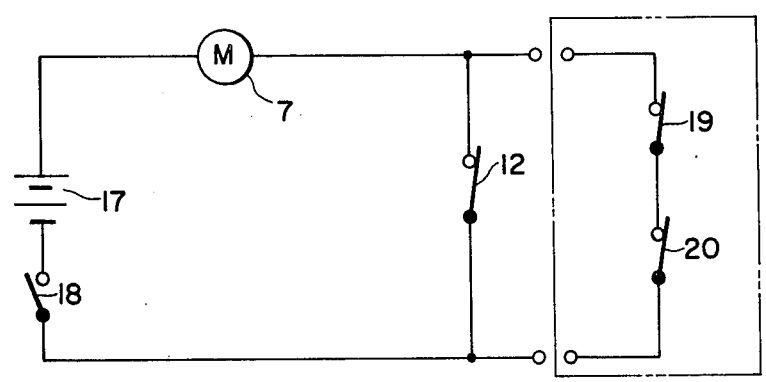
FIG. 5 shows an electrical circuit employed in the example shown in FIG. 2.

FIG. 5 shows a relevant electrical circuit which comprises: a power source 17; and a power switch 18 in series. A clutch interlocking switch 12 is in parallel with the source 17 and switch 18 and a release button interlocking switch 19 with a camera interlocking switch 20 form another parallel loop. The release button interlocking switch 19 is a normally closed switch operated in association with a camera release button. This switch 19 is opened when the release button is depressed and it is closed when the release button is restored. The camera interlocking switch 20 is opened when the winding operation of the camera is completed and it is closed when the release operation is completed.

The operation of the automatic film winding device will now be described. When the power switch 18 is turned on and the camera release button (not shown) is depressed under the condition where a previous winding operation has been completed, then shutter is released. As long as the release button is depressed, the motor 7 is not energized, because the release button interlocking switch 19 is maintained open even if the camera interlocking switch 20 has been closed upon restoration of the shutter. When the switch 19 is closed upon restoration of the release button, the motor 7 is energized. If the release button is released earlier, then switch 19 is closed, but the motor 7 cannot be energized without closing the camera interlocking switch 20.

On the other hand, under the condition that the winding operation has been completed, the roller 2 is on the cam surface 1a in the clutch mechanism of the motor drive wind device. Upon energization of the motor 7, the cam 1 is rotated in the direction of the arrow in FIG. 3 through the drive side reduction gears 6, 5, 4 and 3, and the cam protrusion 1b is locked by the roller 2. However, in this case, the load of the clutch spring 14 is light, and therefore the roller 2 is allowed to ride over the cam protrusion 1b and to move in the direction of the arrow in FIG. 4. As a result, the clutch interlocking switch 12 is closed.

The cam 1 is further rotated, and the winding operation is carried out when the cam protrusion 1d is locked by the roller 2. Upon completion of the winding operation, the camera interlocking switch 20 is opened however, the motor is maintained energized since the clutch interlocking switch 12 is closed. Because the motor continues to rotate, the roller 2 is caused to ride over the cam protrusion 1d and to drop along the slope 1f. At the same time, the driven side is rotated reversely through the roller 2. In this case, the roller 2 is on the cam surface 1a, and therefore the clutch spring load is not applied to the roller 2, the winding load applied to the camera is completely eliminated.

When the roller 2 is moved to the cam surface 1a from the cam surface 1e, then the clutch interlocking switch 12 is opened to deenergize the motor 7. Each of the cam protrusions 1b and 1d occupies a very small angle about one complete cycle 360° of the cam, and the remaining angle can be utilized for the cam over-run which may be caused by the inertia of the motor. Therefore, no brake system is required for the motor. In the case where the winding operation is not yet effectuated, the winding operation can be carried out by turning on the power switch 18. Thus, whenever the winding operation is completed, the motor is stopped.

As is apparent from the above description, according to the invention, when the winding operation is completed, the load applied to the camera is completely eliminated, while the clutch spring load is not applied to the motor drive wind device. Thus, the durability and reliability of the system are markedly improved. Furthermore, no brake system is required for the motor.

It is apparent that modifications of this invention can be made without departing from the essential scope of the invention.

What is claimed is:

1. In an automatic film winding device in a camera having a camera wind coupling coupled to a motor drive through a power transmission mechanism having a cam and a follower, the improvement comprising: said cam having a first cam surface for maintaining a motor drive circuit energized and a second cam surface for a film winding operation in said camera, wherein following a shutter release operation in said camera said motor drive circuit is energized and said follower is displaced to said first cam surface by the relative motion of said first cam surface and follower caused to be displaced to said second cam surface by the further rotation of said motor, said motor drive circuit maintained energized until the completion of a winding operation in said camera whereby said second cam surface is disengaged from said follower by the relative motion of said cam second surface and follower to deenergize said motor drive circuit.

2. The film winding device of claim 1 said motor drive circuit further comprises a shutter release switch and an interlock switch in series with said shutter release switch, said interlock switch closed upon completion of the shutter run and said motor drive being actuated by closure of both said shutter release switch and said interlock switch.

3. The film winding device of claims 1 or 2 wherein said power transmission mechanism comprises a series of reduction gears coupling said motor to said cam and an interlock gear coupled to said cam follower.

4. The film winding device of claim 3 further comprising a clutch interlock switch and a switch actuating surface coupled to said interlock gear and opening said switch when said second cam surface is disengaged from said follower.

5. The winding device of claim 3 further comprising a spring to bias said follower into contact with said cam.

* * * * *